US012601913B2

(12) United States Patent　　　(10) Patent No.: US 12,601,913 B2
Nagata　　　　　　　　　　　　　　　(45) Date of Patent: Apr. 14, 2026

(54) DISPLAY APPARATUS AND DISPLAY SYSTEM

(71) Applicant: Sony Group Corporation, Tokyo (JP)

(72) Inventor: Koji Nagata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 264 days.

(21) Appl. No.: 18/255,105

(22) PCT Filed: Nov. 15, 2021

(86) PCT No.: PCT/JP2021/041835
§ 371 (c)(1),
(2) Date: May 31, 2023

(87) PCT Pub. No.: WO2022/130863
PCT Pub. Date: Jun. 23, 2022

(65) Prior Publication Data
US 2024/0019695 A1　　　Jan. 18, 2024

(30) Foreign Application Priority Data

Dec. 16, 2020　　(JP) ................................. 2020-208457

(51) Int. Cl.
G02B 27/01　　　　(2006.01)
(52) U.S. Cl.
CPC .... G02B 27/0101 (2013.01); G02B 2027/011 (2013.01)
(58) Field of Classification Search
CPC .......... G02B 27/0101; G02B 2027/011; G02B 27/01
See application file for complete search history.

(56) References Cited

U.S. PATENT DOCUMENTS

| 2005/0212719 A1* | 9/2005 | Arai | ..................... G02B 26/108 |
| | | | 359/630 |
| 2008/0088526 A1* | 4/2008 | Kadantseva | ........... G02B 27/01 |
| | | | 345/1.1 |
| 2020/0342567 A1 | 10/2020 | Eric | |
| 2024/0036311 A1* | 2/2024 | Mochizuki | ............. B60K 35/50 |

FOREIGN PATENT DOCUMENTS

| CN | 102902064 A | 1/2013 |
| CN | 104884994 A | 9/2015 |
| CN | 105590615 A | 5/2016 |
| JP | H10-149085 A | 6/1998 |

(Continued)

OTHER PUBLICATIONS

International Search Report and Written Opinion mailed on Dec. 28, 2021, received for PCT Application PCT/JP2021/041835, filed on Nov. 15, 2021, 10 pages including English Translation.

*Primary Examiner* — Matthew Y Lee
(74) *Attorney, Agent, or Firm* — XSENSUS LLP

(57) ABSTRACT

[Object] To easily display an image with reduced distortion on a screen having a curved surface.

[Solving Means] A display apparatus includes a plurality of display elements that emits image light to a screen having a curved surface, the plurality of display elements being arranged at non-uniform intervals therebetween such that the image light emitted from the plurality of display elements is reflected on the curved surface to display a target image.

19 Claims, 6 Drawing Sheets

(56) References Cited

FOREIGN PATENT DOCUMENTS

| | | | | | |
|---|---|---|---|---|---|
| JP | H1130764 | A | * | 2/1999 | |
| JP | 2011-158703 | A | | 8/2011 | |
| JP | 2020-098270 | A | | 6/2020 | |
| JP | 2020129067 | A | * | 8/2020 | ............ B60K 35/28 |
| JP | 2020-160296 | A | | 10/2020 | |
| JP | 2020-190677 | A | | 11/2020 | |

* cited by examiner

DISPLAY APPARATUS AND DISPLAY SYSTEM

TECHNICAL FIELD

The present disclosure relates to a display apparatus that displays (projects) images on a screen. The present disclosure further relates to a display system including a display apparatus and a display control apparatus that generates image rendering data and outputs the image rendering data to the display apparatus.

BACKGROUND ART

There is known a display apparatus (head-up display system) that displays (projects) images on a windshield of a vehicle as a screen (Patent Literature 1).

CITATION LIST

Patent Literature

Patent Literature 1: Japanese Patent Application Laid-open No. 2020-190677

DISCLOSURE OF INVENTION

Technical Problem

In display apparatuses such as LCDs and organic LEDs, pixels are arranged vertically and horizontally in order to efficiently arrange the pixels. Meanwhile, the windshield of a vehicle has a free-form surface. Hence, when a target image is displayed on the windshield without correction, the image is seen distorted by a viewer. For example, when a straight line is displayed, it is not seen as a straight line. In a projector-type head-up display system, distortion is corrected by a free-form surface lens. Meanwhile, a direct projection type head-up display system reduces distortion by using, for example, a flat combiner.

In view of the circumstances as described above, it is an object of the present disclosure to more easily display an image with reduced distortion on a screen having a curved surface.

Solution to Problem

A display apparatus according to an embodiment of the present disclosure includes a plurality of display elements that emits image light to a screen having a curved surface, the plurality of display elements being arranged at non-uniform intervals therebetween such that the image light emitted from the plurality of display elements is reflected on the curved surface to display a target image.

According to this embodiment, attention is paid to a point where an image displayed on a screen having a curved surface is inevitably distorted, and a display apparatus including display elements arranged so as to display a target image on a screen having a curved surface is achieved. Specifically, the plurality of display elements is arranged at non-uniform intervals therebetween (not in a square array) so as to display a target image. The image light emitted from the plurality of display elements is reflected on the screen, so that an image (virtual image) is displayed on the screen. Since the screen has a free-form surface, the image displayed on the screen does not have the same shape (similar shape) as the arrangement of the plurality of display elements, but has the shape of the target image. Thus, according to this embodiment, the target image can be displayed on the screen having the curved surface without using optical elements such as a combiner and lenses.

By the reflection of the image light on the curved surface, a part of an image displayed by first image light, which is a part of the image light, is enlarged for display as compared to another part of the image displayed by second image light, which is another part of the image light, and the plurality of display elements is arranged such that intervals between a plurality of display elements that emits the second image light are wider than intervals between a plurality of display elements that emits the first image light.

The intervals between the plurality of display elements that emits the second image light are arranged to be wider than the intervals between the plurality of display elements that emits the first image light. Meanwhile, the first image light is enlarged for display as compared to the second image light. Thus, the first image light from the display elements in the narrow arrangement is displayed to be widened more than the second image light from the display elements in the wide arrangement. Thus, a part of the image displayed by the first image light and another part of the image displayed by the second image light have a similar size, so that a target image is displayed.

The plurality of display elements is arranged to have a similar shape to a virtual image displayed by reflection of virtual image light on the curved surface when the virtual image light is emitted to the screen from a plurality of virtual display elements arranged in a shape of the target image.

Typically, the arrangement of the display elements has the shape of the target image, but the displayed image has a shape (distorted shape) different from the shape of the target image. Conversely, in this embodiment, the arrangement of the display elements is inversely converted into a shape (distorted shape) different from the shape of the target image, so that an image to be displayed is formed into the shape of the target image.

The target image has a shape of a rectangle. The plurality of display elements is arranged in a first direction and a second direction that are directions corresponding to two orthogonal sides of the rectangle such that the image light emitted from the plurality of display elements is reflected on the curved surface to display a rectangular image.

A plurality of rows of display elements is arranged in the first direction, and the number of a plurality of display elements included in each of the rows arranged in the first direction is equal.

A plurality of rows of display elements is arranged in the second direction, and the number of a plurality of display elements included in each of the rows arranged in the second direction is equal.

The plurality of display elements is arranged at non-uniform intervals therebetween in a matrix in the first direction as a direction corresponding to a side in one direction of the target image (rectangle) and in the second direction as a direction corresponding to a side in a direction orthogonal to the one direction. Thus, the image light emitted from the plurality of display elements is reflected on the curved surface of the screen, so that a rectangular image is displayed.

The plurality of display elements is arranged such that a distance between display elements at both ends of the display elements in a first row, which are arranged in the first direction and output image light for displaying one side of the rectangle, is different from a distance between display elements at both ends of the display elements in a second row, which are arranged in the first direction and output image light for displaying another side opposite to the one side.

Specifically, the distance between the display elements at both ends of the display elements in the second row is longer than the distance between the display elements at both ends of the display elements in the first row. Meanwhile, an image (a part of the entire image) displayed by the first image light is enlarged for display as compared to an image (a part of the entire image) displayed by the second image light. Specifically, the enlargement ratio of the display elements in the first row in which the distance between the display elements at both ends is short is the largest, and the enlargement ratio of the display elements in the second row in which the distance between the display elements at both ends is long is the smallest. Such enlargement is continuously performed from the second image light to the first image light. Thus, the image displayed by the image light emitted from the plurality of display elements has the shape (rectangle) of the target image.

The plurality of display elements is configured by combining a plurality of blocks divided in the first direction and the second direction.

Further, for example, when some of the display elements fail, a single block including such display elements is replaced, which makes it possible to easily cope with the failure. Meanwhile, if all the display elements are mounted on a single substrate, for example, when some of the display elements fail, the substrate on which all the display elements are mounted must be replaced. Hence, it is also advantageous from an economical point of view to combine a plurality of blocks (divided substrates) in each of which the display elements are mounted. Combining a plurality of different types of blocks makes it possible to manufacture display apparatuses having various different shapes (shapes having different lengths in the first direction, different lengths in the second direction, and different curvatures).

Lengths of the plurality of blocks in the second direction are all equal.

Since the lengths of the respective blocks in the second direction are all equal, different types of blocks can be combined in the first direction without gaps.

Lengths of the plurality of blocks in the first direction differ depending on a curvature of the curved surface on which image light emitted from a plurality of display elements included in the plurality of blocks is reflected.

Use of the plurality of blocks having different lengths in the first direction makes it possible to cope with different curvatures of the curved surface of the screen. Specifically, as the curvature of the curved surface of the screen becomes larger, blocks having a shorter length in the first direction are used, so that an image close to the target image (rectangle) can be displayed even if the curvature of the curved surface of the screen is large. As the curvature of the curved surface of the screen becomes smaller, blocks having a longer length in the first direction are used, so that an image closer to the target image (rectangle) can be displayed even if the curvature of the curved surface of the screen is small.

The number of the plurality of display elements in the first direction included in each of the plurality of blocks is equal.

The number of the plurality of display elements in the second direction included in each of the plurality of blocks is equal.

Since the number of the plurality of display elements included in each of the blocks having different sizes is equal, consequently, the intervals between the plurality of display elements differ for each of the blocks. Thus, a display apparatus including a plurality of display elements at non-uniform intervals therebetween can be easily produced by combining a plurality of types of blocks.

Each of the plurality of blocks has a fan shape.

The first direction may be a circumferential direction of the fan shape, and the second direction may be a radial direction of the fan shape.

Combining the plurality of fan-shaped blocks into a fan shape without gaps makes it possible to manufacture a display apparatus including the blocks arranged in a fan-shaped matrix.

Each of the plurality of blocks has a shape of a trapezoid.

The first direction may be a base direction of the trapezoid, and the second direction may be a leg direction of the trapezoid.

When both ends of a pair of line segments, which are the diameters of the fan-shaped blocks, are connected by straight lines, a trapezoid (isosceles trapezoid) is formed, in which the first direction is the base direction and the second direction is the leg direction. Combining the plurality of trapezoidal blocks thus configured into a fan shape without gaps makes it possible to manufacture a display apparatus including the blocks arranged in a fan-shaped matrix.

The plurality of display elements may be a plurality of pixels.

The plurality of display elements may be a plurality of sub-pixels.

The display apparatus may further include a moving mechanism that moves the plurality of display elements with respect to the screen and adjusts a position of the image.

A display system according to an embodiment of the present disclosure includes: a display apparatus including a plurality of display elements that emits image light to a screen having a curved surface, the plurality of display elements being arranged at non-uniform intervals therebetween such that the image light emitted from the plurality of display elements is reflected on the curved surface to display a target image; and a display control apparatus that generates image rendering data and outputs the image rendering data to the display apparatus.

MODE(S) FOR CARRYING OUT THE INVENTION

Hereinafter, an embodiment of the present disclosure will be described with reference to the drawings.

This embodiment relates to a head-up display system to be mounted on a vehicle. In the head-up display system to be mounted on a vehicle, a display apparatus installed on a dashboard or the like displays (projects) an image toward a windshield as a screen. A viewer (an occupant such as a driver) views the image displayed (projected) on the windshield. The windshield of the vehicle has a free-form surface. Hence, when a target image is displayed (projected) on the windshield without correction, the displayed image is distorted for the viewer. The distortion of the image differs depending on the curvature of the windshield on the basis of the difference in the display position of the image on the windshield and the difference in the position of the viewer who views the image (driver's seat, passenger's seat, etc.).

1. Head-Up Display System

Figure 1:
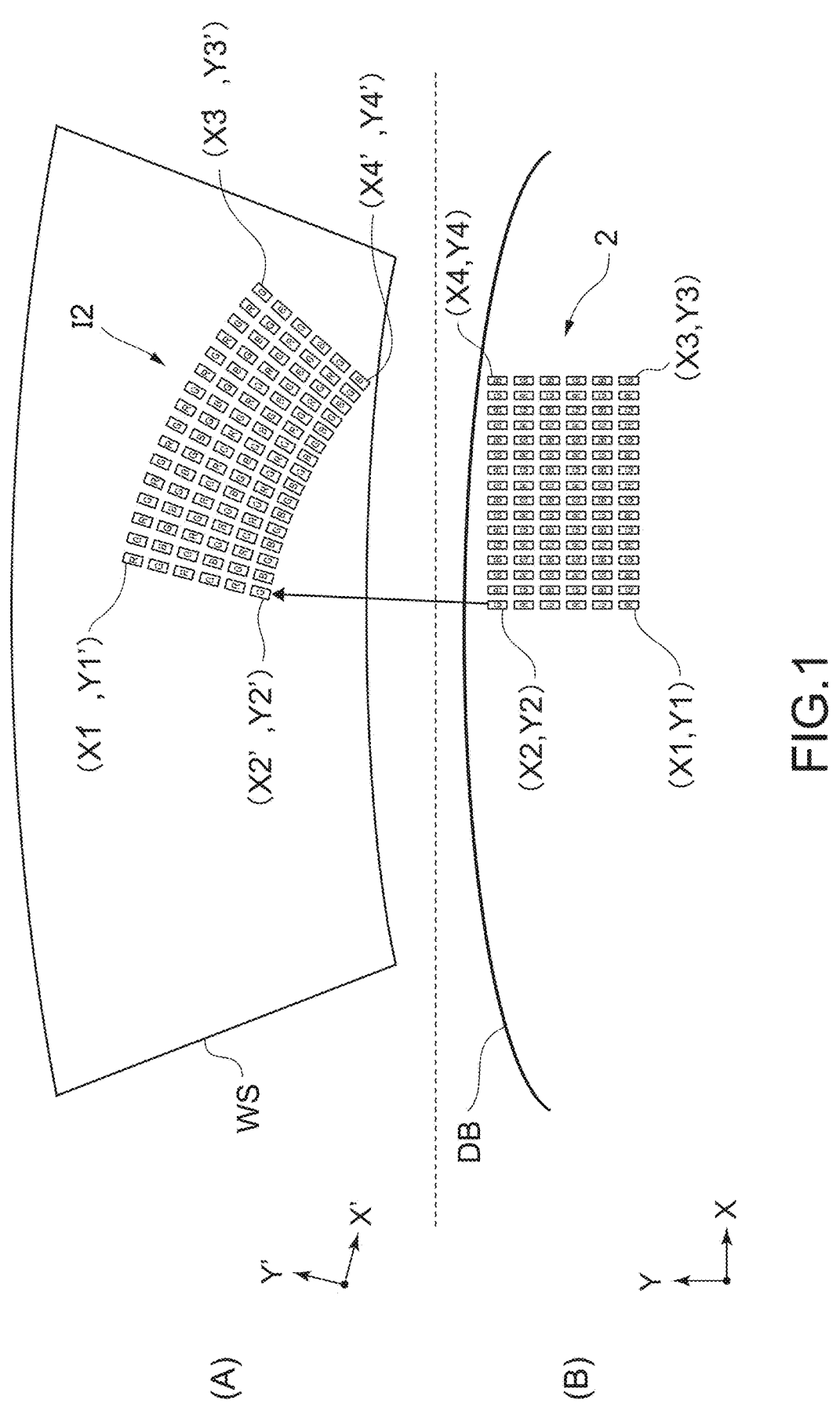
FIG. 1 schematically shows an example of a head-up display system using a liquid crystal display (LCD) or the like, in which (A) is a front view of a windshield as a screen and (B) is a top view of a display apparatus installed on a dashboard.

FIG. 1 schematically shows a typical head-up display system using a liquid crystal display (LCD) or an organic light emitting diode (LED), in which (A) is a front view of a windshield as a screen and (B) is a top view of a display apparatus (LCD, organic LED, etc.) installed on a dashboard. In the head-up display system of FIG. 1, the windshield as a screen is directly irradiated with light from an LCD panel or LED elements (display elements) without using a distortion correction lens or a distortion correction mirror. Here, the display apparatus is installed on a part of the dashboard for the purpose of explanation, but the display apparatus may be arranged on the dashboard to the same or substantially the same extent as the width of the windscreen so as to be capable of performing display over the entire region/substantially the entire region of the width of the windscreen.

A display apparatus 2 is of a direct projection type and is installed on a dashboard DB. The display apparatus 2 includes a plurality of display elements (sub-pixels or pixels including a plurality of sub-pixels; the same will apply hereinafter) that emits image light. The plurality of display elements is arranged in a matrix in two orthogonal axis (X-axis and Y-axis) directions (that is, in a rectangular shape) (so-called square array). The plurality of display elements is arranged in the shape of a target image (that is, the shape of an image without distortion). The image light emitted by the plurality of display elements is reflected on the windshield WS, so that an image I2 (virtual image) is displayed on the windshield WS. Since the windshield WS has a free-form surface, the image I2 displayed on the windshield WS has a distorted shape rather than the shape of the target image (that is, the same shape (similar shape) as the arrangement of the plurality of display elements).

Specifically, the display apparatus 2 includes the plurality of display elements in six rows arranged in the Y direction. Each row includes the same number (16) of display elements arranged in the X direction (orthogonal to the Y direction). The row farthest from the windshield WS (first row) includes a plurality of display elements (X1, Y1) to (X3, Y3). The row closest to the windshield WS (second row) includes a plurality of display elements (X2, Y2) to (X4, Y4). When the light emitted from the plurality of display elements is reflected on the curved surface of the windshield WS, the image I2 is displayed on the windshield WS. An image by the image light (first image light) (X1', Y1') to (X3', Y3') emitted from the plurality of display elements (X1, Y1) to (X3, Y3) in the first row is displayed at a position farthest from the dashboard DB. An image by the image light (second image light) (X2', Y2') to (X4', Y4') emitted from the plurality of display elements (X2, Y2) to (X4, Y4) in the second row is displayed at a position closest to the dashboard DB.

Depending on the curvature of the free-form surface of the windshield WS and the distance from the display apparatus 2, the distortion of the image displayed by the first image light (X1', Y1') to (X3', Y3') emitted from the plurality of display elements (X1, Y1) to (X3, Y3) in the first row is different from the distortion of the image displayed by the second image light (X2', Y2') to (X4', Y4') emitted from the plurality of display elements (X2, Y2) to (X4, Y4) in the second row. Specifically, the image (a part of the entire image) displayed by the first image light (X1', Y1') to (X3', Y3') is enlarged for display as compared to the image (a part of the entire image) displayed by the second image light (X2', Y2') to (X4', Y4'). Specifically, the first image light (X1', Y1') to (X3', Y3') is displayed so as to have a larger area in units of display elements and have wider intervals between the image light emitted from adjacent display elements. Such enlargement is continuously performed from the second image light (X2', Y2') to (X4', Y4') to the first image light (X1', Y1') to (X3', Y3'). Thus, the image displayed by the image light emitted from the plurality of display elements arranged in a rectangular shape has a fan shape. In this embodiment, a fan shape without a central corner portion (that is, the shape of an expanded view of a side surface of a truncated cone) will be simply referred to as a "fan shape" for convenience.

Typically, the display apparatuses such as an LCD and an organic LED are designed with the same idea as semiconductors, in which display elements are arranged at regular intervals vertically and horizontally (in a rectangular shape) with an emphasis on efficiency, and as many display elements as possible are packed at high density. If the display is viewed directly or projection (direct projection type) is performed onto a flat display, it is better to arrange the display elements at regular intervals at a high density. However, if the screen has a curved surface in a direct projection type display system, an image to be displayed is inevitably distorted with respect to the arrangement of the display elements.

Further, with the progress of future automated driving, there is a possibility of a growing need for simultaneously viewing of images on a wide and large screen (for example, an image of infotainment content) by both a viewer seated in the driver's seat and a viewer seated in the passenger's seat. In this case, it is desired to display an image with less distortion for both the viewer seated in the driver's seat and the viewer seated in the passenger's seat.

2. Head-Up Display System According to Embodiment of Present Disclosure

Figure 2:
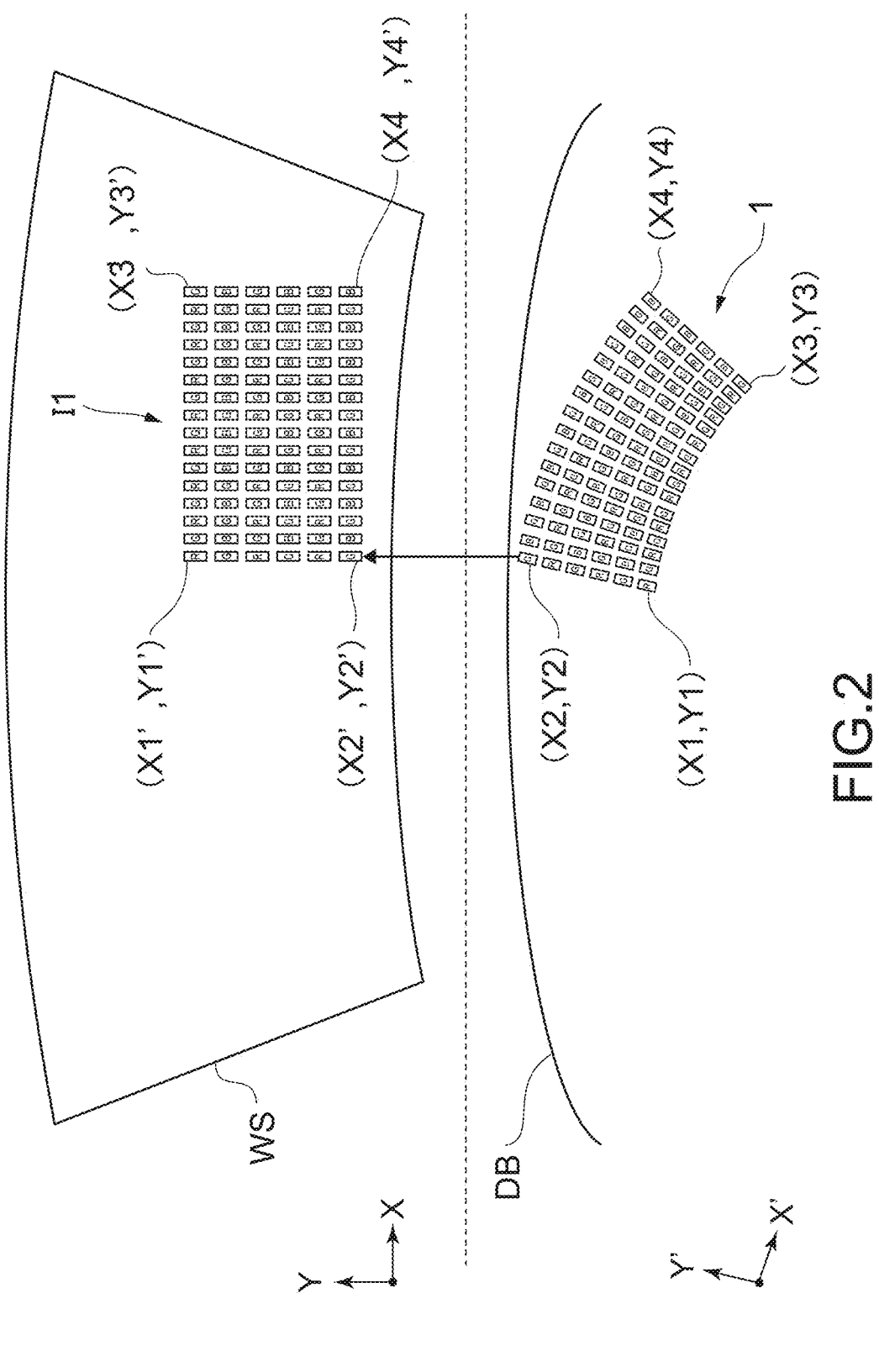
FIG. 2 schematically shows a head-up display system according to an embodiment of the present disclosure, in which (A) is a front view of a windshield as a screen and (B) is a top view of a display apparatus installed on a dashboard.

In view of the circumstances as described above, in this embodiment, attention is paid to a point where an image displayed on a screen having a curved surface is inevitably distorted, and a display apparatus including display elements arranged so as to display a target image on a screen having a curved surface is achieved. FIG. 2 schematically shows a head-up display system according to an embodiment of the present disclosure, in which (A) is a front view of a windshield as a screen and (B) is a top view of a display apparatus installed on a dashboard.

In the head-up display system of FIG. 2, the windshield as a screen is directly irradiated with light from an LCD panel or LED elements (display elements) without using a distortion correction lens or a distortion correction mirror. Here, the display apparatus is installed on a part of the dashboard for the purpose of explanation, but the display apparatus may be arranged on the dashboard to the same or substantially the same extent as the width of the windscreen so as to be capable of performing display over the entire region/substantially the entire region of the width of the windscreen.

In this embodiment, a target image to be displayed on the windshield WS is rectangular. In other words, the shape of the target image is the same as the arrangement of the plurality of display elements of the display apparatus 2 (FIG. 1) according to the example of FIG. 1. In this regard, in a display apparatus 1 of this embodiment, a plurality of display elements is arranged to have a similar shape to a virtual image (image I2 of FIG. 1) displayed by reflection of virtual image light on the curved surface of the windshield WS when the virtual image light is emitted to the windshield WS from a plurality of virtual display elements (display elements of the display apparatus 2 of FIG. 1) arranged in the shape (rectangle) of the target image.

In short, in the example of FIG. 1, the arrangement of the display elements has the shape of the target image, but the displayed image has a shape (distorted shape) different from the shape of the target image. Conversely, in this embodiment, the arrangement of the display elements is inversely converted into a shape (distorted shape) different from the shape of the target image, so that an image to be displayed is formed into the shape of the target image. Specifically, the arrangement of the display elements is formed into the shape of the virtual image (image I2 of FIG. 1) displayed by the plurality of virtual display elements (display elements of the display apparatus 2 of FIG. 1) arranged in the shape (rectangle) of the target image, so that an image to be displayed is formed into the shape (rectangle) of the target image.

The display apparatus 1 is of a direct projection type and is installed on a dashboard DB. The display apparatus 1 includes, as a light source, a fine LED element such as a micro LED panel. The display apparatus 1 includes a plurality of display elements (sub-pixels or pixels including a plurality of sub-pixels; the same will apply hereinafter) that emits image light. In FIG. 2, a sub-pixel means each of "R", "G", "B", and "G", and a pixel means a group of "RGBG". The plurality of display elements is arranged at non-uniform intervals therebetween (which is not square array) so as to display a target image I1. The image light emitted by the plurality of display elements is reflected on the windshield WS, so that an image I1 (virtual image) is displayed on the windshield WS. Since the windshield WS has a free-form surface, the image I1 displayed on the windshield WS does not have the same shape (similar shape) as the arrangement of the plurality of display elements and has the shape of the target image.

The target image I1 is rectangular. The plurality of display elements is arranged in the X' direction (first direction) and the Y' direction (second direction), which are directions corresponding to two orthogonal sides (XY) of the rectangle, such that the image light emitted from the plurality of display elements is reflected on the curved surface of the windshield WS to display the rectangular image I1. Specifically, the plurality of display elements is arranged in a matrix of a fan shape (precisely, the shape of an expanded view of a side surface of a truncated cone; the fan shape without central corner portion). The plurality of display elements is arranged in a matrix in the X' direction (first direction), which is a direction corresponding to a side in the X direction, and the Y' direction (second direction), which is a direction corresponding to a side in the Y direction, the X' direction and the Y' direction being two orthogonal sides of the target image I1 (rectangle). Hereinafter, for convenience, the radial direction of the fan shape will be referred to as the X' direction (first direction), and the circumferential direction of the fan shape will be referred to as the Y' direction (second direction).

Specifically, the display apparatus 1 includes the plurality of display elements in six rows arranged in the Y' direction. Each row includes the same number (16) of display elements arranged in the X' direction. The row farthest from the windshield WS (first row) includes a plurality of display elements (X1, Y1) to (X3, Y3). The row closest to the windshield WS (second row) includes a plurality of display elements (X2, Y2) to (X4, Y4). The number of display elements included in each row and arranged in the X' direction is equal. In the example shown in the figure, the number of display elements included in the first row (X1, Y1) to (X3, Y3), the number of display elements included in the second row (X2, Y2) to (X4, Y4), and the number of display elements included in every rows interposed therebetween are equal. The number of display elements included in each column and arranged in the Y' direction is equal. In the example shown in the figure, the number of display elements included in the leftmost column (X1, Y1) to (X2, Y2), the number of display elements included in the rightmost column (X3, Y3) to (X4, Y4), and the number of display elements included in every columns interposed therebetween are equal. The shape and size of all display elements are equal.

Note that FIG. 1 and FIG. 2 show 6×16 display elements for easy understanding of the illustration. Actually, for example, one pixel including three sub-pixels has a size of approximately 0.003 square millimeters. For example, a display apparatus having a size of approximately 40 cm by approximately 45 cm, which is converted into a rectangle from the fan shape, includes approximately 115,200 pixels.

The display elements (X1, Y1) to (X3, Y3) in the first row are arranged in the X' direction and output the image light for displaying one side (X1', Y1') to (X3', Y3') of the rectangular image I1 in the X direction. The display elements (X2, Y2) to (X4, Y4) in the second row are arranged in the X' direction and output the image light for displaying another side (X2', Y2') to (X4', Y4'), which is the opposite side of the one side (X1', Y1') to (X3', Y3') of the rectangular image I1 in the X direction. The plurality of display elements is arranged such that a distance between the display elements (X1, Y1) and (X3, Y3) at both ends of the display elements in the first row differs from a distance between the display elements (X2, Y2) and (X4, Y4) at both ends of the display elements in the second row. Specifically, the plurality of display elements is arranged such that the interval between the plurality of display elements (X2, Y2) to (X4, Y4) that emit the second image light is wider than the interval between the plurality of display elements (X1, Y1) to (X3, Y3) that emit the first image light. Hence, the distance between the display elements (X2, Y2) and (X4, Y4) at both ends of the display elements in the second row is longer than the distance between the display elements (X1, Y1) and (X3, Y3) at both ends of the display elements in the first row.

The light emitted from the plurality of display elements is reflected on the curved surface of the windshield WS, so that the image I1 is displayed on the windshield WS. In the image I1, an image by the image light (first image light) (X1', Y1') to (X3', Y3') emitted from the plurality of display elements (X1, Y1) to (X3, Y3) in the first row is displayed at a position farthest from the dashboard DB. An image by the image light (second image light) (X2', Y2') to (X4', Y4') emitted from the plurality of display elements (X2, Y2) to (X4, Y4) in the second row is displayed at a position closest to the dashboard DB.

Depending on the curvature of the free-form surface of the windshield WS and the distance from the display apparatus 1, the distortion of the image displayed by the first image light (X1', Y1') to (X3', Y3') emitted from the plurality of display elements (X1, Y1) to (X3, Y3) in the first row is different from the distortion of the image displayed by the second image light (X2', Y2') to (X4', Y4') emitted from the plurality of display elements (X2, Y2) to (X4, Y4) in the second row. Specifically, the image (a part of the entire image) displayed by the first image light (X1', Y1') to (X3', Y3') is enlarged for display as compared to the image (a part of the entire image) displayed by the second image light (X2', Y2') to (X4', Y4'). Specifically, the first image light (X1', Y1') to (X3', Y3') is displayed so as to have a larger area in the XY directions in units of display elements and also have wider intervals between adjacent display elements in the XY directions. Such enlargement is continuously performed from the second image light (X2', Y2') to (X4', Y4') to the first image light (X1', Y1') to (X3', Y3').

As described above, the distance between the display elements (X2, Y2) and (X4, Y4) at both ends of the display elements in the second row is longer than the distance between the display elements (X1, Y1) and (X3, Y3) at both ends of the display elements in the first row. Meanwhile, the image (a part of the entire image) displayed by the first image light (X1', Y1') to (X3', Y3') is enlarged for display as compared to the image (a part of the entire image) displayed by the second image light (X2', Y2') to (X4', Y4'). Specifically, the enlargement ratio of the display elements (X1, Y1) to (X3, Y3) in the first row in which the distance between the display elements at both ends is short is the largest, and the enlargement ratio of the display elements (X2, Y2) to (X4, Y4) in the second row in which the distance between the display elements at both ends is long is the smallest. Such enlargement is continuously performed from the second image light (X2', Y2') to (X4', Y4') to the first image light (X1', Y1') to (X3', Y3'). Thus, the image I1 displayed by the image light emitted from the plurality of display elements arranged in the fan shape of the display apparatus 1 is rectangular.

In other words, the intervals between the plurality of display elements (X2, Y2) to (X4, Y4) that emits the second image light (X2', Y2') to (X4', Y4') are arranged to be wider than the intervals between the plurality of display elements (X1, Y1) to (X3, Y3) that emits the first image light (X1', Y1') to (X3', Y3'). Meanwhile, the first image light (X1', Y1') to (X3', Y3') is enlarged for display as compared to the second image light (X2', Y2') to (X4', Y4'). Thus, the first image light (X1', Y1') to (X3', Y3') from the display elements (X1, Y1) to (X3, Y3) in the narrow arrangement is displayed to be widened more than the second image light (X2', Y2') to (X4', Y4') from the display elements (X2, Y2) to (X4, Y4) in the wide arrangement. Thus, a part of the image displayed by the first image light (X1', Y1') to (X3', Y3') and a part of the image displayed by the second image light (X2', Y2') to (X4', Y4') have a similar size, so that a rectangular target image is displayed.

3. Configuration of Display Element

As described above, the plurality of display elements of the display apparatus 1 forms a fan shape by being arranged in a matrix in the X' direction (radial direction) and the Y' direction (circumferential direction). The numbers of the plurality of display elements included in the respective rows and arranged in the X' direction are equal. The numbers of the plurality of display elements included in the respective columns and arranged in the Y' direction are equal. All the display elements may be mounted on a single substrate. However, in this embodiment, the plurality of display elements is divided into blocks each including the same number of display elements. In other words, a plurality of blocks (divided substrates) each including the same number of display elements is combined to constitute the display apparatus 1.

Figure 3:
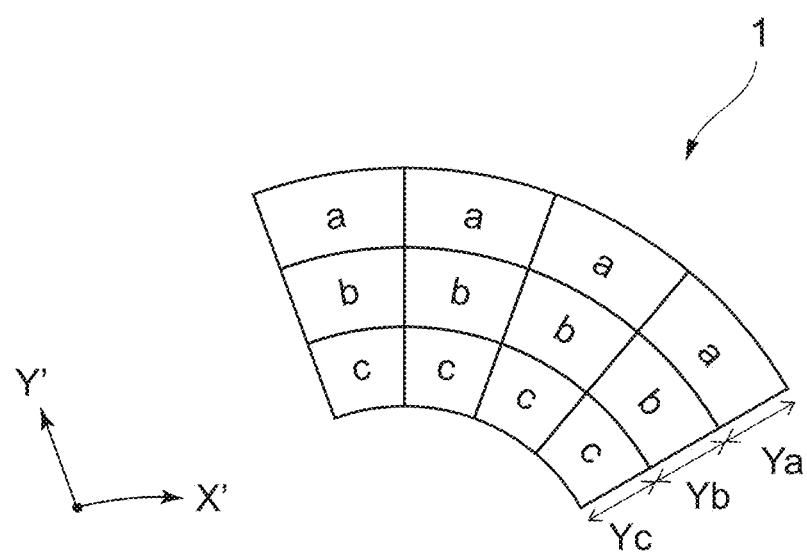
FIG. 3 schematically shows a plurality of blocks including a plurality of display elements.

FIG. 3 schematically shows a plurality of blocks including the plurality of display elements.

The plurality of display elements (which are the same as in FIG. 2) included in the display apparatus 1 is configured by combining a plurality of (12) fan-shaped blocks a, b, and c, which are divided into 4×3 blocks in the X' direction (circumferential direction) by the Y' direction (radial direction). The four blocks a are congruent, the four blocks b are congruent, and the four blocks c are congruent. The degree of a virtual central angle (not shown) of each of the fan-shaped blocks a, b, and c is equal. The lengths Ya, Yb, and Yc of the respective blocks a, b, and c in the Y' direction are all equal. The length of the arc in the X' direction of the block a opposed to the block b is equal to the length of the arc in the X' direction of the block b opposed to the block a. The length of the arc in the X' direction of the block c opposed to the block b is equal to the length of the arc in the X' direction of the block b opposed to the block c. Due to the shape of the blocks a, b, and c described above, the plurality of (12) fan-shaped blocks a, b, and c is combined into a fan shape including 4×3 blocks (the shape of the display apparatus 1 in FIG. 2) without gaps.

Each of the blocks a, b, and c includes a plurality of display elements. The number of display elements in the X' direction included in each of the plurality of blocks a, b, and c is equal. The number of display elements in the Y' direction included in each of the plurality of blocks a, b, and c is equal. In the example shown in FIG. 2 and FIG. 3, each of the blocks a, b, and c includes 4×2 (X' direction by Y' direction)=8 display elements. In each of the blocks a, b, and c, eight display elements are arranged in a fan-shaped matrix (4×2) such that four display elements are arranged in the X' direction at regular intervals, and two display elements are arranged in the Y' direction at regular intervals. Meanwhile, the size of each of the blocks a, b, and c differs depending on the distance (radial length) from the virtual central angle (not shown). Hence, the arrangement of the display elements in each of the blocks a, b, and c differs. More specifically, the blocks located at positions closer to the virtual central angle (not shown) (e.g., blocks c) have narrower intervals between the plurality of display elements in the X' direction, and the blocks located at positions farther from the virtual central angle (not shown) (e.g., blocks a) have wider intervals between the plurality of display elements in the X' direction.

The plurality of fan-shaped blocks a, b, and c thus configured is combined into a fan shape without gaps, so that it is possible to manufacture the display apparatus 1 of FIG. 2 (display apparatus 1 in which 96 display elements are arranged in a fan-shaped matrix of 6×16 display elements (Y' direction by X' direction). Since the number (12) of display elements included in each of the blocks a, b, and c having different sizes is equal, consequently, the intervals between the plurality of display elements differ for each of the blocks a, b, and c. Thus, the display apparatus 1 in which the intervals between the plurality of display elements are non-uniform can be easily produced by combining the plurality of types of blocks a, b, and c.

According to this embodiment, the twelve blocks a, b, and c in each of which the same number (eight) of display elements are mounted are combined to constitute the display apparatus 1. Thus, for example, when some of the display elements fail, a single block including such display elements is replaced, which makes it possible to easily cope with the failure. Meanwhile, if all the display elements are mounted on a single substrate, for example, when some of the display elements fail, the substrate on which all the display elements are mounted must be replaced. Hence, it is also advantageous from an economical point of view to combine a plurality of blocks (divided substrates) in each of which the display elements are mounted. In addition, combining a plurality of different types of blocks on each of which the same number of display elements are mounted makes it possible to manufacture display apparatuses having different shapes from the display apparatus 1.

Figure 4:
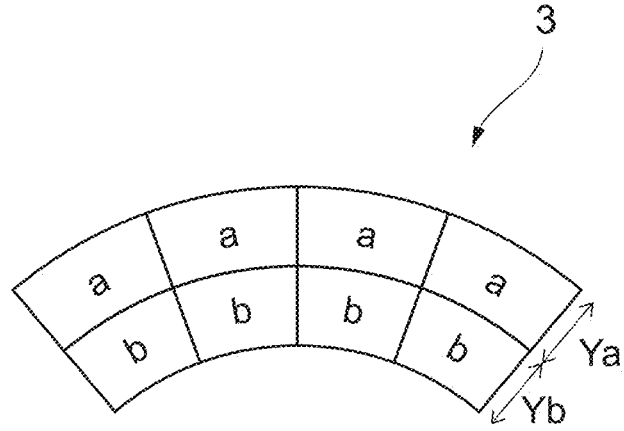
FIG. 4 schematically shows an example of a combination of the plurality of blocks.

FIG. 4 schematically shows an example of a combination of the plurality of blocks.

The four blocks a and the four blocks b (which are the same as in FIG. 3) are combined, so that a display apparatus 3 having the same curvature as that of and a different size from that of the display apparatus 1 (FIG. 2, FIG. 3) can be manufactured. In this example, the display apparatus 3 including 4×2=8 blocks is manufactured by reducing the number of blocks in the Y' direction from the 4×3=12 blocks of the display apparatus 1. In contrast to this, increasing the number of blocks in the Y' direction or increasing or decreasing the number of blocks in the X' direction also makes it possible to further produce different display apparatuses.

Figure 5:
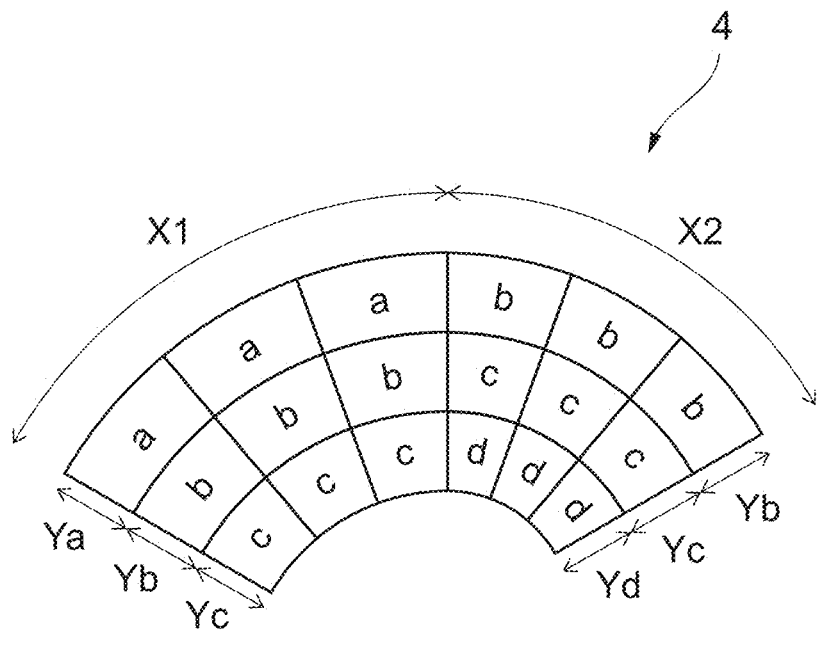
FIG. 5 schematically shows another example of a combination of the plurality of blocks.
Figure 5:

FIG. 5 schematically shows another example of a combination of the plurality of blocks.

The curvature of the curved surface of the windshield WS, on which the image light emitted from the plurality of display elements included in a display apparatus 4 is reflected, varies depending on a display position. For example, the curvature of the curved surface of the windshield WS in the vicinity of a sideview mirror is larger than the curvature of the curved surface of the windshield WS in front of the driver's seat (the curvature is tight). Hence, if a wide-width image is displayed from the front of the driver's seat to the vicinity of the sideview mirror, the curvature of the curved surface of the windshield WS changes in the middle. In such a case, the curvature of the plurality of blocks is changed.

The display apparatus 4 includes a plurality of blocks a, b, and c (which are the same as in FIG. 3) and a plurality of blocks d. The X1 side of the display apparatus 4 (front side of the driver's seat) includes the plurality of blocks a, b, and c, and the combination thereof is similar to that of FIG. 3. Meanwhile, the X2 side of the display apparatus 4 (sideview mirror side) has a different curvature from that of the X1 side.

The plurality of display elements included on the X1 side of the display apparatus 4 is configured by combining a plurality of (nine) fan-shaped blocks a, b, and c, which are divided into 3×3 blocks in the X' direction (circumferential direction) by the Y' direction (radial direction). The plurality of display elements included on the X2 side of the display apparatus 4 is configured by combining a plurality of (nine) fan-shaped blocks b, c, and d, which are divided into 3×3 blocks in the X' direction (circumferential direction) by the Y' direction (radial direction). The three blocks a are congruent, the six blocks b are congruent, the six blocks c are congruent, and the three blocks d are congruent. The degree of a virtual central angle (not shown) of each of the fan-shaped blocks a, b, c, and d is equal. The lengths Ya, Yb, Yc, and Yd of the respective blocks a, b, c, and d in the Y' direction are all equal. The length of the arc in the X' direction of the block a opposed to the block b is equal to the length of the arc in the X' direction of the block b opposed to the block a. The length of the arc in the X' direction of the block c opposed to the block b is equal to the length of the arc in the X' direction of the block b opposed to the block c. The length of the arc in the X' direction of the block c opposed to the block d is equal to the length of the arc in the X' direction of the block d opposed to the block c. Due to the shape of the blocks a, b, c, and d described above, the nine fan-shaped blocks a, b, and c on the X1 side are combined into a fan shape including 3×3 blocks without gaps, and the nine fan-shaped blocks b, c, and d on the X2 side are combined into a fan shape including 3×3 blocks without gaps. In particular, since the lengths Ya, Yb, Yc, and Yd of the respective blocks a, b, c, and d in the Y' direction are all equal, different types of blocks (e.g., blocks a and b) can be combined in the X' direction without gaps. Thus, the blocks a, b, and c at the end on the X1 side and the blocks b, c, and d at the end on the X2 side are combined without gaps.

In such a manner, use of a plurality of blocks each having a different length in the X' direction makes it possible to cope with different curvatures of the curved surface of the windshield WS. Specifically, as the curvature of the curved surface of the windshield WS becomes larger (the curvature becomes tighter), the blocks d having a shorter length in the X' direction are used. Thus, even if the curvature of the curved surface of the windshield WS is large, an image close to the target image (rectangle) can be displayed.

Figure 6:
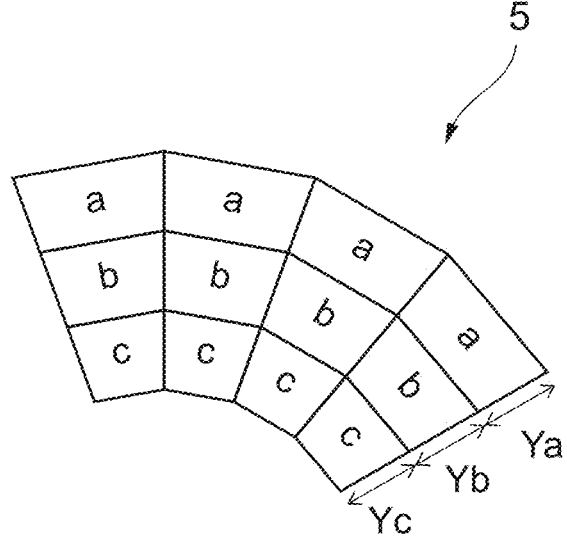
FIG. 6 schematically shows a modified example of the plurality of blocks.

FIG. 6 schematically shows a modified example of the plurality of blocks.

The shape of the plurality of blocks constituting the fan-shaped display apparatus 1 is not limited to the fan shape (FIGS. 3, 4, and 5). The shape of the block may be a polygon. For example, the shape of the block may be a trapezoid. When both ends of a pair of line segments, which are the diameters of the fan-shaped blocks, are connected by straight lines, a trapezoid (e.g., an isosceles trapezoid) is formed in which the X' direction is the base direction and the Y' direction is the leg direction. For example, if all of the fan-shaped blocks a, b, and c of the display apparatus 1 (FIG. 3) are formed into a trapezoid as described above, a display apparatus 5 of FIG. 6 is obtained. Combining the plurality of trapezoidal blocks a, b, and c configured as described above into a fan shape without gaps makes it possible to manufacture the display apparatus 1 of FIG. 2 (display apparatus 1 in which 96 display elements are arranged in a fan-shaped matrix of 6×16 display elements (Y' direction by X' direction)).

Figure 8:
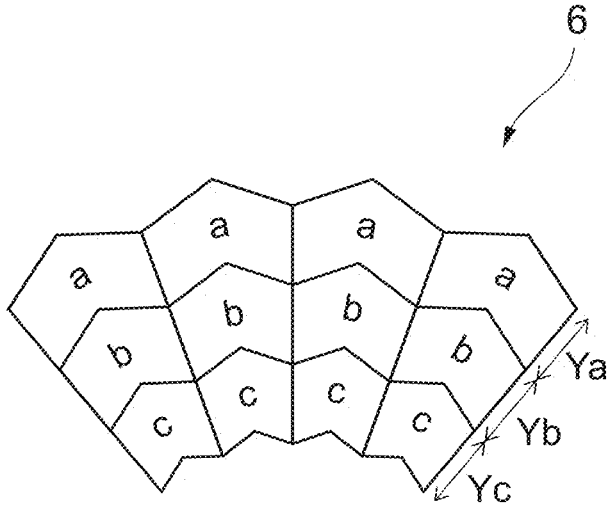
FIG. 8 schematically shows a still another modified example of the plurality of blocks.

Further, a polygon obtained by approximating the arc in the circumferential direction of the fan shape (FIGS. 3, 4, and 5) by a line segment may be used. Here, a polygon obtained by approximating the arc in the circumferential direction by a line segment includes a trapezoid. FIG. 8 is an example of a display apparatus 6 obtained by combining polygons (with fletching shape), in each of which the arc in the circumferential direction is approximated by a line segment, into a fan shape without gaps, and is an example of a polygon (with fletching shape) different from a trapezoid.

If the blocks are fan-shaped, the degrees of the virtual central angles of different sized fan-shaped blocks are all equal. The same applies to the case where the block is a trapezoid or a polygon (including a trapezoid) in which the arc is approximated by a line segment. The degree of the angle at the intersection point formed by a pair of straight lines obtained by virtually extending a pair of oblique sides of each of the trapezoidal blocks having different sizes is equal.

Further, if the block is a polygon (e.g., a trapezoid or a polygon approximated by a line segment) and a plurality of blocks is arranged in the circumferential direction at the same radial positions as in FIG. 5, use of a plurality of blocks in which line segments corresponding to the arcs have different lengths makes it possible to cope with different curvatures of the curved surface of the windshield WS.

4. Configuration of Display System

Figure 7:
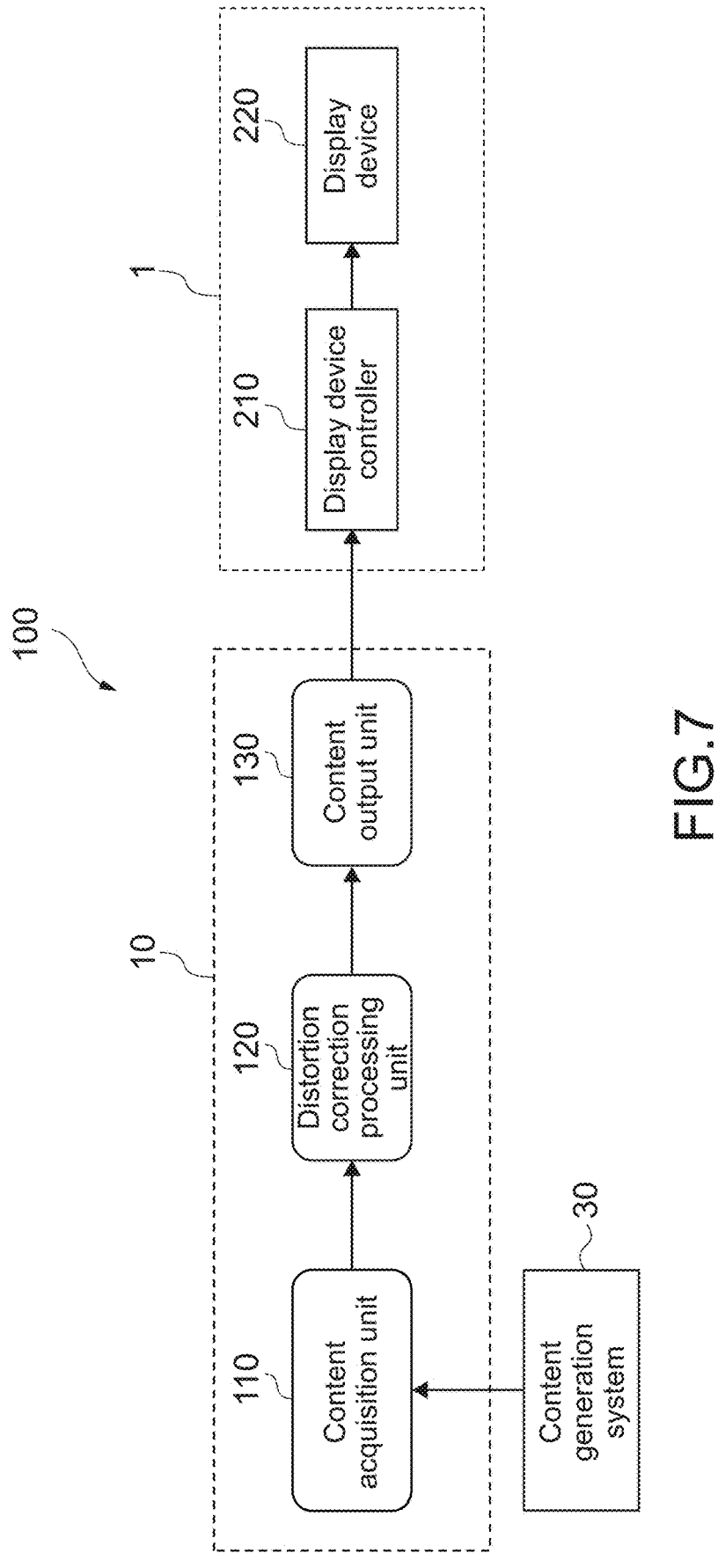
FIG. 7 shows a configuration of a display system including the display apparatus.

FIG. 7 shows a configuration of a display system including the display apparatus.

A display system 100 is a head-up display system to be mounted on a vehicle. The display system 100 includes a display control apparatus 10 and the display apparatus 1.

The display control apparatus 10 acquires data (image, metadata) of content (e.g., security-related content, navigation content, infotainment content, and vehicle information content such as speed) from a content generation system 30. The display control apparatus 10 loads a display control program, which is recorded on the ROM, to the RAM, and the CPU executes that program, thus implementing a content acquisition unit 110, a distortion correction processing unit 120, and an output unit 130. The display control apparatus 10 acquires images of the content (content acquisition unit 110), generates rendering data of corrected images (distortion correction processing unit 120), and outputs the rendering data to the display apparatus 1 (output unit 130). For example, the distortion correction processing unit 120 corrects an image on the basis of a position at which the image is displayed on the windshield (display position) and a viewer's position (driver's seat or passenger seat, eye position (height), and the like) such that the distortion of the image is reduced when the viewer views the image displayed at the display position of the windshield from the viewer's position.

The display apparatus 1 is installed on, for example, the dashboard of the vehicle. The display apparatus 1 includes a display device controller 210 and a display device 220. The display device 220 has a configuration shown in FIG. 1 and the like and includes, for example, a fine LED element such as a micro LED panel as a light source. The display device controller 210 controls the display device 220 to display (project) an image toward the windshield of the vehicle as a screen on the basis of the rendering data input from the display control apparatus 10. The viewer views the image displayed (projected) from the display device 220 and reflected on the windshield. The display device 220 (micro LED panel or the like) is, for example, installed over the entire region of the dashboard in the width direction. Thus, the image is displayed over the entire region of the windshield in the width direction. The display device 220 may be a single panel continuous over the entire region of the dashboard in the width direction or may include a plurality of panels divided in the width direction of the dashboard.

The content generation system 30 is a generic term for a plurality of mutually independent apparatuses that generate content of images to be displayed on the display apparatus 1. The content generation system 30 includes, for example, a safety-related content generation apparatus, a navigation apparatus, an infotainment apparatus, and a vehicle information generation apparatus. The safety-related content generation apparatus, the navigation apparatus, the infotainment apparatus, and the vehicle information generation apparatus respectively generate data (images, metadata) of the content and output the data to the display control apparatus 10.

The display apparatus 1 may include a moving mechanism that moves the display device 220 including the plurality of display elements with respect to the windshield, in the width direction of the windshield and/or the front-rear direction of the windshield, and adjusts the position of the image (virtual image).

5. Conclusion

According to this embodiment, attention is paid to a point where an image displayed on a screen having a curved surface is inevitably distorted, and a display apparatus including display elements arranged so as to display a target image on a screen having a curved surface is achieved. Specifically, the plurality of display elements is arranged at non-uniform intervals therebetween (not in a square array) so as to display the target image I1. The image light emitted from the plurality of display elements is reflected on the windshield WS, so that the image I1 (virtual image) is displayed on the windshield WS. Since the windshield WS has a free-form surface, the image I1 displayed on the windshield WS does not have the same shape (similar shape) as the arrangement of the plurality of display elements, but has the shape of the target image. Thus, according to this embodiment, the target image can be displayed on the windshield WS having the curved surface without using optical elements such as a combiner and lenses.

Meanwhile, the shape of the windshield WS differs depending on the vehicle type. Hence, the optimal arrangement of the display elements for the windshield WS differs depending on the vehicle type. It is not economically realistic to manufacture display apparatuses with different arrangements for each vehicle type. In this regard, according to this embodiment, the display apparatus 1 is configured by combining a plurality of blocks (divided substrates) each including the same number of display elements. The lengths of the blocks in the Y' direction are all equal, and the lengths of adjacent blocks in the X' direction are equal. This makes it possible to combine the plurality of blocks without gaps. Further, use of a plurality of blocks having different lengths in the X' direction makes it possible to cope with different curvatures of the curved surface of the windshield WS. Specifically, as the curvature of the curved surface of the windshield WS becomes larger, blocks having a shorter length in the X' direction are used, so that an image close to the target image (rectangle) can be displayed even if the curvature of the curved surface of the windshield WS is large. As the curvature of the curved surface of the windshield WS becomes smaller, blocks having a longer length in the X' direction are used, so that an image closer to the target image (rectangle) can be displayed even if the curvature of the curved surface of the windshield WS is small.

Further, for example, when some of the display elements fail, a single block including such display elements is replaced, which make it possible to easily cope with the failure. Meanwhile, if all the display elements are mounted on a single substrate, for example, when some of the display elements fail, the substrate on which all the display elements are mounted must be replaced. Hence, it is also advantageous from an economical point of view to combine a plurality of blocks (divided substrates) on each of which the display elements are mounted. Combining a plurality of different types of blocks makes it possible to manufacture display apparatuses having various different shapes (shapes having different lengths in the X' direction, different lengths in the Y' direction, and different curvatures).

Further, the number of display elements included in each block is set to be the same, but may be changed.

Further, the lengths Ya, Yb, and Yc of the respective blocks in the radial direction are set to be the same, but the lengths of Ya, Yb, and Yc may be changed. Note that if the shape of each block is an isosceles trapezoid, the shape of each block may be similar to each other by changing the lengths Ya, Yb, and Yc of the respective blocks in the radial direction.

The present disclosure may also have the following configurations.

(1)

A display apparatus, including a plurality of display elements that emits image light to a screen having a curved surface, the plurality of display elements being arranged at non-uniform intervals therebetween such that the image light emitted from the plurality of display elements is reflected on the curved surface to display a target image.

(2)

The display apparatus according to (1), in which by the reflection of the image light on the curved surface, a part of an image displayed by first image light, which is a part of the image light, is enlarged for display as compared to another part of the image displayed by second image light, which is another part of the image light, and the plurality of display elements is arranged such that intervals between a plurality of display elements that emits the second image light are wider than intervals between a plurality of display elements that emits the first image light.

(3)

The display apparatus according to (1) or (2), in which the plurality of display elements is arranged to have a similar shape to a virtual image displayed by reflection of virtual image light on the curved surface when the virtual image light is emitted to the screen from a plurality of virtual display elements arranged in a shape of the target image.

(4)

The display apparatus according to any one of (1) to (3), in which the target image has a shape of a rectangle, the plurality of display elements is arranged in a first direction and a second direction that are directions corresponding to two orthogonal sides of the rectangle such that the image light emitted from the plurality of display elements is reflected on the curved surface to display a rectangular image, a plurality of rows of display elements is arranged in the first direction, and the number of a plurality of display elements included in each of the rows arranged in the first direction is equal, and a plurality of rows of display elements is arranged in the second direction, and the number of a plurality of display elements included in each of the rows arranged in the second direction is equal.

(5)

The display apparatus according to (4), in which the plurality of display elements is arranged such that a distance between display elements at both ends of the display elements in a first row, which are arranged in the first direction and output image light for displaying one side of the rectangle, is different from a distance between display elements at both ends of the display elements in a second row, which are arranged in the first direction and output image light for displaying another side opposite to the one side.

(6)

The display apparatus according to (4) or (5), in which the plurality of display elements is configured by combining a plurality of blocks divided in the first direction and the second direction.

(7)

The display apparatus according to (6), in which lengths of the plurality of blocks in the second direction are all equal.

(8)

The display apparatus according to (6) or (7), in which lengths of the plurality of blocks in the first direction differ depending on a curvature of the curved surface on which image light emitted from a plurality of display elements included in the plurality of blocks is reflected.

(9)

The display apparatus according to any one of (6) to (8), in which the number of the plurality of display elements in the first direction included in each of the plurality of blocks is equal, and the number of the plurality of display elements in the second direction included in each of the plurality of blocks is equal.

(10)

The display apparatus according to any one of (6) to (9), in which each of the plurality of blocks has a fan shape, and the first direction is a circumferential direction of the fan shape, and the second direction is a radial direction of the fan shape.

(11)

The display apparatus according to any one of (6) to (9), in which each of the plurality of blocks has a shape of a trapezoid, and the first direction is a base direction of the trapezoid, and the second direction is a leg direction of the trapezoid.

(12)

The display apparatus according to any one of (1) to (11), in which the plurality of display elements is a plurality of pixels.

(13)

The display apparatus according to any one of (1) to (12), in which the plurality of display elements is a plurality of sub-pixels.

(14)

The display apparatus according to any one of (1) to (13), further including a moving mechanism that moves the plurality of display elements with respect to the screen and adjusts a position of the image.

(15)

A display system, including:

a display apparatus including a plurality of display elements that emits image light to a screen having a curved surface, the plurality of display elements being arranged at non-uniform intervals therebetween such that the image light emitted from the plurality of display elements is reflected on the curved surface to display a target image; and a display control apparatus that generates image rendering data and outputs the image rendering data to the display apparatus.

The embodiments and modified examples of the present technology have been described above, but the present technology is not limited to the embodiments described above and can be variously modified without departing the gist of the present technology.

REFERENCE SIGNS LIST 1, 2, 3, 4, 5 display apparatus
10 display control apparatus
100 display system
110 content acquisition unit
120 distortion correction processing unit
130 output unit
210 display device controller
220 display device
30 content generation system
DB dashboard
I1, 12 image
WS windshield
a, b, c, d block

The invention claimed is:

1. A display apparatus for a vehicle having a screen having a curved surface, comprising:

a plurality of display elements that emits image light to the screen in the case that the display apparatus is installed into the vehicle, the plurality of display elements being arranged at non-uniform intervals therebetween in a first direction and a second direction such that the image light emitted from the plurality of display elements is reflected on the curved surface to display a target image, wherein each of a plurality of blocks includes a divided substrate and a subset of the plurality of display elements; and the plurality of blocks divided in the first direction and the second direction are combined to constitute the display apparatus.

2. The display apparatus according to claim 1, wherein by the reflection of the image light on the curved surface, a part of an image displayed by first image light, which is a part of the image light, is enlarged for display as compared to another part of the image displayed by second image light, which is another part of the image light, and the plurality of display elements is arranged such that intervals between a plurality of display elements that emits the second image light are wider than intervals between a plurality of display elements that emits the first image light.

3. The display apparatus according to claim 1, wherein the plurality of display elements is arranged to have a similar shape to a virtual image displayed by reflection of virtual image light on the curved surface when the virtual image light is emitted to the screen from a plurality of virtual display elements arranged in a shape of the target image.

4. The display apparatus according to claim 1, wherein the target image has a shape of a rectangle, the first direction and the second direction that are directions corresponding to two orthogonal sides of the rectangle such that the image light emitted from the plurality of display elements is reflected on the curved surface to display a rectangular image, a plurality of rows of display elements is arranged in the first direction, and the number of a plurality of display elements included in each of the rows arranged in the first direction is equal, and a plurality of rows of display elements is arranged in the second direction, and the number of a plurality of display elements included in each of the rows arranged in the second direction is equal.

5. The display apparatus according to claim 4, wherein the plurality of display elements is arranged such that a distance between display elements at both ends of the display elements in a first row, which are arranged in the first direction and output image light for displaying one side of the rectangle, is different from a distance between display elements at both ends of the display elements in a second row, which are arranged in the first direction and output image light for displaying another side opposite to the one side.

6. The display apparatus according to claim 1, wherein lengths of the plurality of blocks in the second direction are all equal.

7. The display apparatus according to claim 1, wherein lengths of the plurality of blocks in the first direction differ depending on a curvature of the curved surface on which image light emitted from a plurality of display elements included in the plurality of blocks is reflected.

8. The display apparatus according to claim 7, wherein as the curvature of the curved surface becomes larger, blocks having a shorter length in the first direction are used.

9. The display apparatus according to claim 7, wherein as the curvature of the curved surface becomes smaller, blocks having a longer length in the first direction are used.

10. The display apparatus according to claim 1, wherein the number of the plurality of display elements in the first direction included in each of the plurality of blocks is equal, and the number of the plurality of display elements in the second direction included in each of the plurality of blocks is equal.

11. The display apparatus according to claim 1, wherein each of the plurality of blocks has a fan shape, and the first direction is a circumferential direction of the fan shape, and the second direction is a radial direction of the fan shape.

12. The display apparatus according to claim 1, wherein each of the plurality of blocks has a shape of a trapezoid, and the first direction is a base direction of the trapezoid, and the second direction is a leg direction of the trapezoid.

13. The display apparatus according to claim 1, wherein the plurality of display elements is a plurality of pixels.

14. The display apparatus according to claim 1, wherein the plurality of display elements is a plurality of sub-pixels.

15. The display apparatus according to claim 1, further comprising a moving mechanism that moves the plurality of display elements with respect to the screen and adjusts a position of the image.

16. The display apparatus according to claim 1, wherein the display apparatus is configured by combining a first set of the plurality of blocks having a first curvature and a second set of the plurality of blocks having a second curvature different from the first curvature.

17. The display apparatus according to claim 1, wherein the plurality of display elements includes:

a first portion of display elements arranged with first intervals therebetween that emit image light toward a first area of the curved surface that enlarges the reflected image light by a first amount; and a second portion of display elements arranged with second intervals therebetween that emit image light toward a second area of the curved surface that enlarges the reflected image light by a second amount, wherein the first intervals are narrower than the second intervals, and the first amount of enlargement is greater than the second amount of enlargement.

18. A display system for a vehicle having a screen having a curved surface, comprising:

a display apparatus including a plurality of display elements that emits image light to the screen in the case that the display apparatus is installed into the vehicle, the plurality of display elements being arranged at non-uniform intervals therebetween in a first direction and a second direction such that the image light emitted from the plurality of display elements is reflected on the curved surface to display a target image, wherein each of a plurality of blocks includes a divided substrate and a subset of the plurality of display elements, and the plurality of blocks divided in the first direction and the second direction are combined to constitute the display apparatus; and a display control apparatus that generates image rendering data and outputs the image rendering data to the display apparatus.

19. A method of manufacturing a display apparatus, comprising:

providing a plurality of blocks, each of the plurality of blocks including a divided substrate and a subset of a plurality of display elements; and combining the plurality of blocks in a first direction and a second direction to constitute the display apparatus, wherein the plurality of display elements are arranged at non-uniform intervals therebetween in the first direction and the second direction such that image light emitted from the plurality of display elements is reflected on a curved surface of a screen to display a target image.

* * * * *